United States Patent
Nansho

(10) Patent No.: US 6,738,785 B2
(45) Date of Patent: May 18, 2004

(54) SEARCH UNIT, SEARCH SYSTEM AND SEARCH METHOD

(75) Inventor: Yukihiko Nansho, Osaka (JP)

(73) Assignee: Kukuyo Co., Ltd., Osaka (JP)

( * ) Notice: Subject to any disclaimer, the term of this patent is extended or adjusted under 35 U.S.C. 154(b) by 286 days.

(21) Appl. No.: 09/846,188

(22) Filed: May 2, 2001

(65) Prior Publication Data

US 2002/0049706 A1 Apr. 25, 2002

(30) Foreign Application Priority Data

Nov. 2, 2000 (JP) ..................... P2000-336467

(51) Int. Cl.[7] .............. G06F 17/00; G06F 7/00
(52) U.S. Cl. ....................... 707/104.1; 707/3
(58) Field of Search ................ 707/3, 10, 102, 707/104.1, 5; 705/26

(56) References Cited

U.S. PATENT DOCUMENTS

| | | | | |
|---|---|---|---|---|
| 5,032,989 A | * | 7/1991 | Tornetta ....................... 705/1 |
| 5,675,784 A | * | 10/1997 | Maxwell et al. ............ 707/100 |
| 5,991,739 A | * | 11/1999 | Cupps et al. ................. 705/26 |
| 6,119,133 A | * | 9/2000 | Nusbickel et al. .......... 707/205 |
| 6,189,003 B1 | * | 2/2001 | Leal .............................. 707/2 |
| 6,336,100 B1 | * | 1/2002 | Yamada ....................... 705/26 |
| 6,505,171 B1 | * | 1/2003 | Cohen et al. ................. 705/26 |
| 6,523,021 B1 | * | 2/2003 | Monberg et al. ............... 707/2 |
| 6,546,374 B1 | * | 4/2003 | Esposito et al. ............. 705/27 |
| 6,556,975 B1 | * | 4/2003 | Wittsche ...................... 705/26 |
| 6,564,213 B1 | * | 5/2003 | Ortega et al. .................. 707/5 |

* cited by examiner

Primary Examiner—Greta Robinson
Assistant Examiner—Susan Rayyan
(74) Attorney, Agent, or Firm—Banner & Witcoff Ltd.

(57) ABSTRACT

This invention intends to provide a system which makes it easy to search an object by making a number of a procedure of input as less as possible in a case that a factor of an area is regarded as important in searching an object. In order to attain this object an object to be searched is stored in advance together with information on an area relating to the object and the object is output which belongs to the specified area when a condition which is to be the object to be searched is input. If the corresponding information does not exist in a searched area or if the corresponding information is desired to search in an area broader than the searched area, receive an input of a button B of "broaden searching area" so as to broaden the searching area and an area to be searched is broadened from a level of a city, town or village to a level of a country gradually.

12 Claims, 7 Drawing Sheets

SEARCH UNIT, SEARCH SYSTEM AND SEARCH METHOD

BACKGROUND OF THE INVENTION AND RELATED ART STATEMENT

This invention relates to a system for searching a desired object, more concretely to a system for searching an object with considering a factor of an area regarded as important in searching the object.

Conventionally, for searching a desired object by the use of a search system or the like a key word relating to the object is input and then a corresponding object is retrieved from all data existing in a data base and output. As a result, in a case that a factor of an area is regarded as important in searching an object such that a person who is specially interested in a production place of the material or a specific area searches a material supplier neighboring to the production place or the specific area, an area name or the like is required to input as a key word in addition to the object to be searched.

However, in searching an object in a limited area a person who intends to search the object does not know what name the area is registered in a database. Then, for example, the person does not know whether the search should be conduct in a limited area such as a city, town or village or in a boarder area such as a state, a province or a country. As a result, if the person tries to conduct a search all over the area in detail, all the key word such as a name of a city, town or village as well as a name of a state must be input. Because of this, not only an operation to input key words is made complicated but also it takes a lot of time to input key words.

In view of the above problems, the present claimed invention intends to provide a system which makes it easy to search an object with making a number of operation as less as possible in searching the object with considering a factor of an area where the object locates regarded as important.

OBJECT AND SUMMARY OF THE INVENTION

In order to solve the above problems the present claimed invention is so arranged that an object to be searched is stored in advance together with information on an area relating to the object and the object which belongs to the specified area is output when a condition which is to be the object to be searched is input. If there is no object existing in the area or if the object is desired to search in a neighboring area of the above area, instruction to broaden the area to be searched is input and then the object is searched gradually in an area broader than the specified area.

With the above arrangement, a person who inputs an object to be searched does not have to input all names of neighboring areas which relate to the object, thereby to make it easy to conduct a search. As one of the cases in which a factor of an area is regarded as important, there is a case, for example, in an industry such as a manufacturing industry a material supplier or a processor which locates in a neighboring area where a manufacturer locates is searched in order to reduce a cost of transportation. In this case, it is preferable that the material supplier or the processor registers an address thereof together with information on the material or the processing facilities which the material supplier or the processor can supply and that a demander or a manufacturer which makes a final product can search necessary information on the material or the processing in a specific area and further the information can be searched gradually in an area broader than the specific area.

In accordance with the arrangement, the most suitable material supplier or the processor can be searched, thereby to make it possible to conduct an effective search. In addition, in case of conducting a search in a specified area, it is preferable, for example, to output a material supplier or a processor which locates in the same area that a manufacturer which makes a final product locates. With this arrangement, it can not only improve efficiency in transporting the material but also promote development of economy in the area. Further, for example, in a case that a customer has preference for a production place of material or some specific area, it becomes possible to comply the demand of the customer as much as possible.

For a case that a material supplier or a processor registers information on material or processing that the material supplier or the processor can provide, there might be a case that the material or the processing does not fit for assembling into a final product. It is therefore preferable that a manufacturer discloses a required specification in advance and the material supplier or the processor registers information on the material or the processing based on the required specification. With the above arrangement, a trouble can be prevented which might be caused during a process of manufacturing a final product and it becomes smooth for the material supplier or the processor to register the information since a range of the information to be disclosed by the material supplier or the processor becomes clear.

DETAILED DESCRIPTION OF THE PREFERRED EMBODIMENTS

The invention will be described in detail with reference to the embodiments thereof shown in the accompanying drawings.

Figure 1:
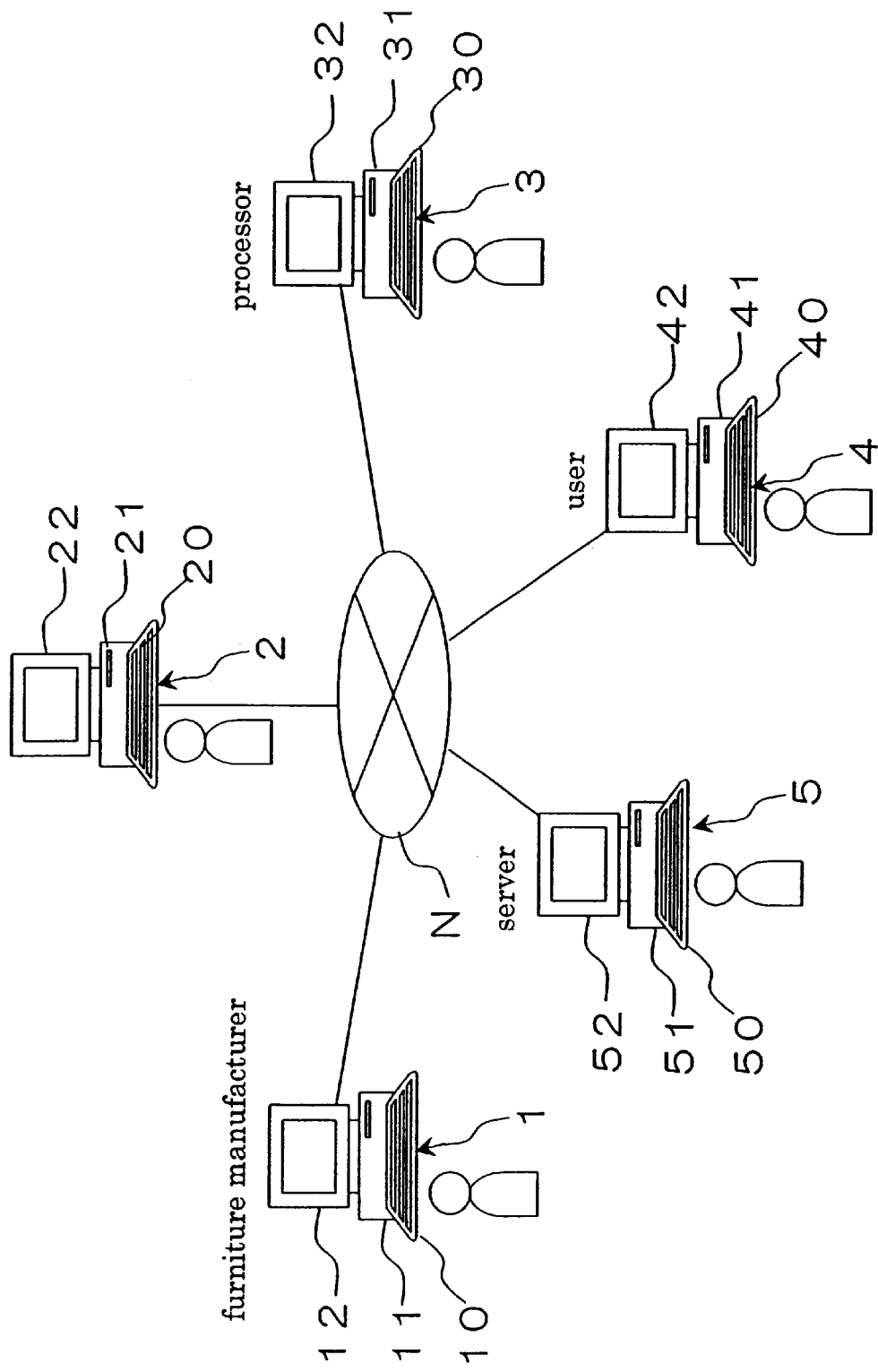
FIG. 1 is a general diagram of a system showing an embodiment of the present claimed invention.

FIG. 1 is a general diagram of a system constituting a system of the invention and comprises a plurality of client computers 1 through 4 connectably arranged through a network N such as the Internet and a server computer 5. The client computers in this system comprise a client computer 1 operated by a furniture manufacturer which assembles a final commodity, a client computer 2 operated by a forest association which supplies materials such as thinned-out woods, a client computer 3 operated by a processor of the materials and a client computer 4 operated by mainly a purchaser of furniture, and further comprises the server computer 5 which stores information input by the client computers 1 though 4. The server computer 5 may also serve as a function of these client computers 1 though 4, however, in this embodiment it functions independently.

The client computer 1 provided on a side of the furniture manufacturer comprises an input means 10 comprising a keyboard with which a required specification for a commodity to be manufactured, material or processing is input by the furniture manufacturer, a body 11 to process data and a display means 12 comprising a display to display a predetermined output and is provided at a place where the furniture manufacturer or a person concerned can operate. The client computer 2 provided on a side of the supplier of the thinned-out woods comprises an input means 20 comprising a keyboard like the input means 10, a body 21 and a display means 22 comprising a display and is so arranged that information on materials such as thinned-out woods can be input based on the required specification presented by the furniture manufacturer. The client computer 3 provided on a side of the processor comprises an input means 30 such as a keyboard, a body 31 and a display means 32 such as a display and is so arranged that information on the processing such as lumbering or painting can be input based on the required specification presented by the furniture manufacturer. The client computer 4 provided on a side of a demander also comprises an input means 40 comprising a keyboard, a body 41 and a display means 42 comprising a display and is so made that a commodity to be sold which is presented by the furniture manufacturer can be searched and that desired material or method of processing for the commodity can be selected or searched as well. The server computer 5 is provided to be connectable with these client computers 1 through 4 and comprises an input means 50, a body 51 and a display means 52 like the client computers 1 through 4. The server computer 5 stores information on the commodity, the material or the processing which is input with the client computers 1 through 4 and is so made that the demander can select or search the information.

Figure 2:
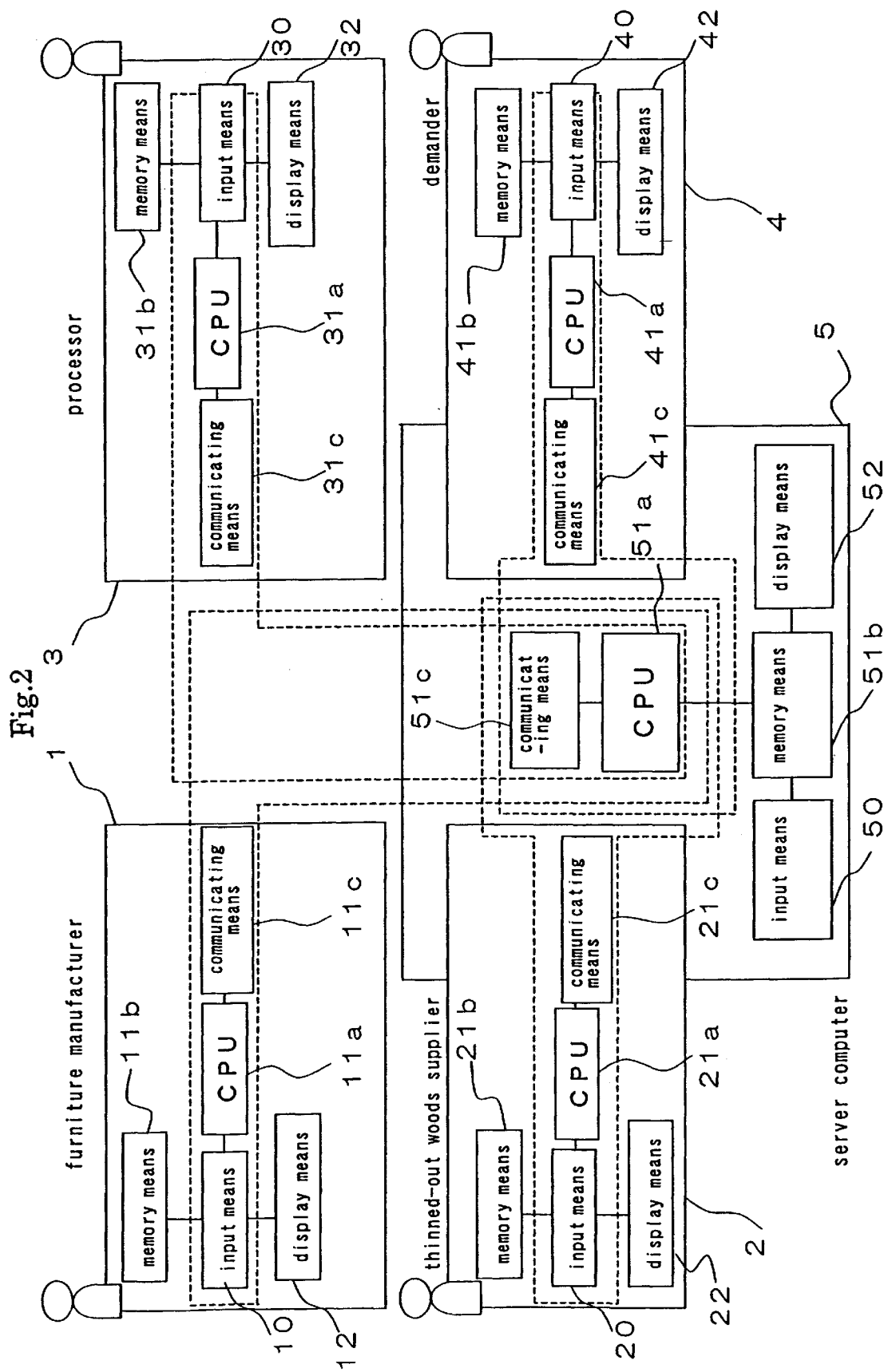
FIG. 2 is a functional block diagram of the system in the embodiment.

The FIG. 2 shows a functional block of thus arranged system. CPUs (11*a*, 21*a*, 31*a*, 41*a*, 51*a*) provided on the client computers 1 though 4 and the server computer 5 are to control each of the client computers 1 through 4 and the server computer 5 having the CPUs (11*a*, 21*a*, 31*a*, 41*a*, 51*a*) and so arranged to be operated by a program stored on each of memory means (11*b*, 21*b*, 31*b*, 41*b*, 51*b*). Each of the input means (10, 20, 30, 40, 50) is so arranged that the input data is received from an operator like a keyboard or a mouse, while each of the display means (12, 22, 32, 42, 52) is so arranged to display information that is input by the input means (10, 20, 30, 40, 50) or that is sent or received through the network N.

Figure 3:
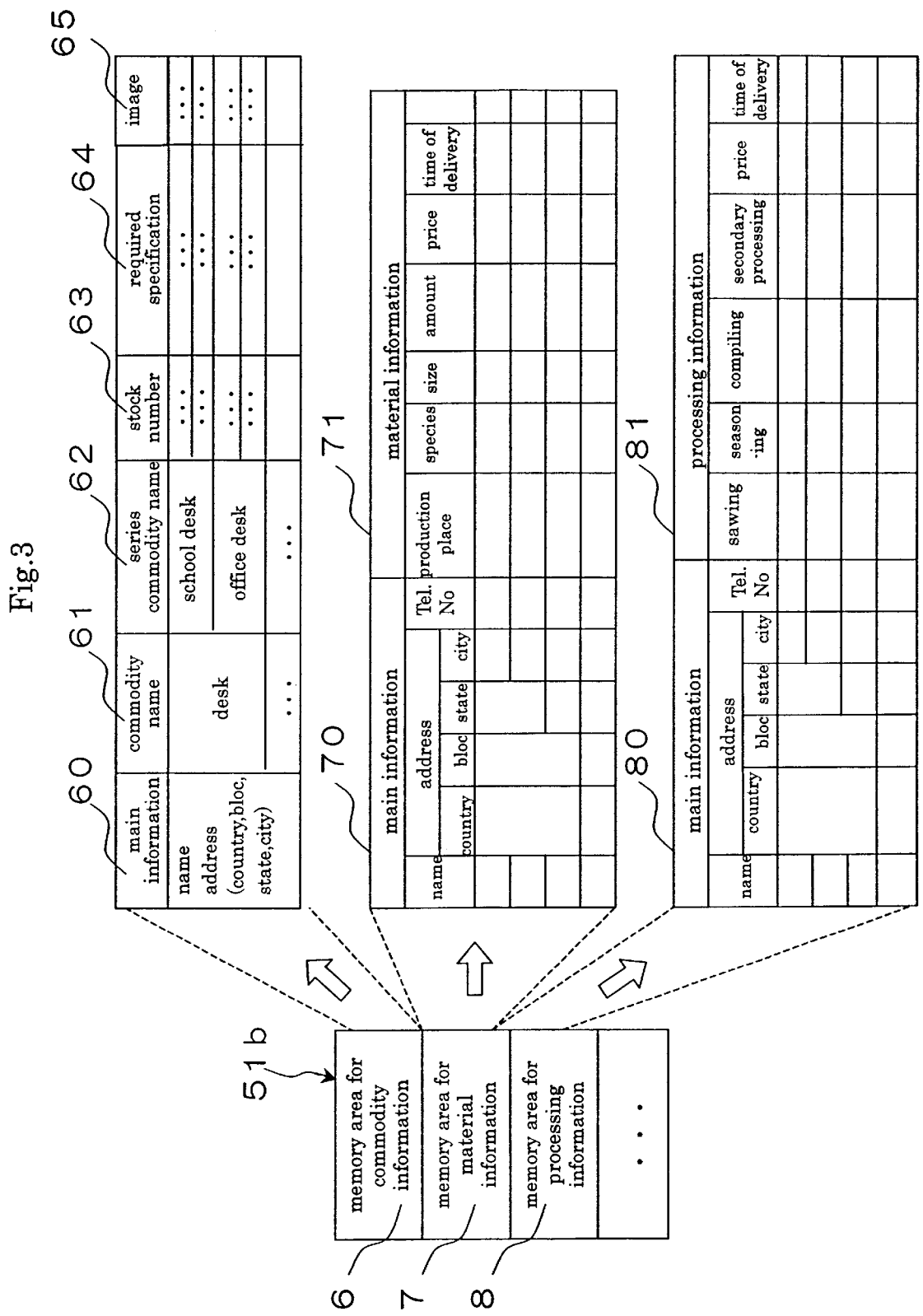
FIG. 3 is a memory map of a server computer in the embodiment.
Figure 4:
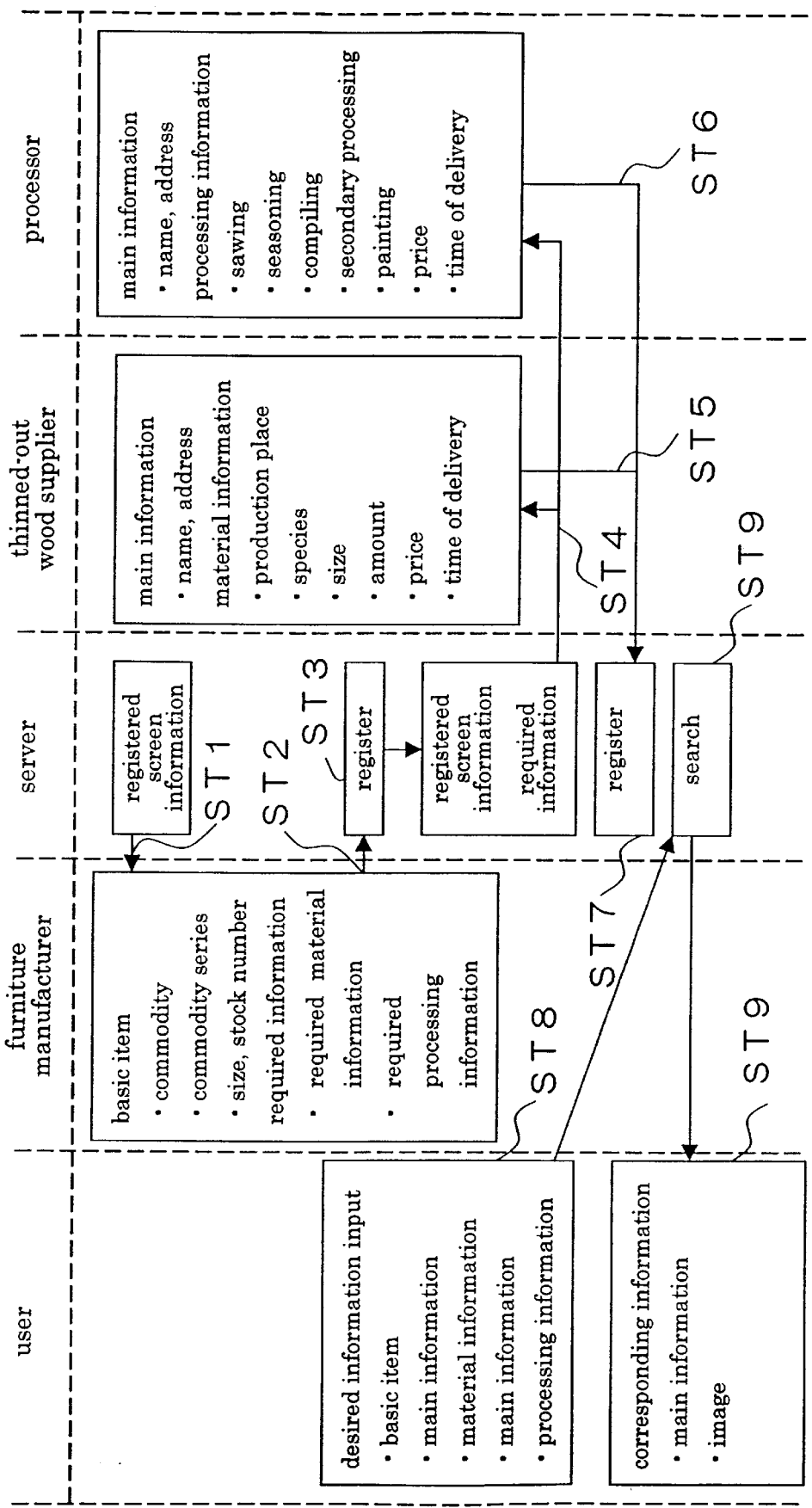
FIG. 4 is an overall flow chart of the system in the embodiment.

The memory means (11*b*, 21, 31, 41, 51*b*) stores a program for the client computers 1 through 4 and the server computer 5 and also stores information which corresponds to environment where the client computers 1 through 4 are arranged. For example, the memory means 51*b* of the server computer 5 stores, as shown in a memory map of FIG. 3, the information on the commodity or the required specification concerning the material or the processing presented by the furniture manufacturer, the information on the thinned-out woods registered by the material supplier or the information on the processing registered by the processor.

More specifically, the memory means 51*b* of the server computer 5 is provided with a memory area 6 for commodity information input by the client computer 1 of the furniture manufacturer, a memory area 7 for material information input by the client computer 2 of the thinned-out wood supplier and a memory area 8 for processing information input by the client computer 3 of the processor. The memory area 6 for commodity information has a memory area for main information 60 which stores a name and an address of a furniture manufacturer which makes, for example, desks or chairs classified by a country name, a state name, a city, town or village name and a number of a street, for a commodity name 61 which is roughly classified for the convenience of a furniture manufacturer and for a series commodity name 62 such as a school desk or an office desk and also stores a required specification 64 concerning materials which constitute the commodity or processing of the commodity corresponding to a stock number 63 of the series commodity name 62. Information on a production place, a species, a size, a shape or a number of thinned-out woods is input concerning the material and information on sawing, seasoning, compiling, a secondary processing or painting is input concerning the processing as the required specification 63. An image 64 of a finished commodity corresponding to the material or the processing can be stored for each stock number and can be output on the client computer 4.

The memory area 7 for material information stores main information 70 on a name, address (a country name, a state name, a city, town or village name and a number of a street) or telephone number of the material supplier and material information 71 which is input by the material supplier from the client computer 2 through the network N. As the material information 71 stored is, concretely a production place, a species, a size, a shape or a number of the thinned-out woods in addition to an appointed date of delivery or a price thereof which is input corresponding to the required specification of the furniture manufacturer.

The memory area 8 for processing information stores main information 80 on a name, address (a country name, a state name, a city, town or village name and a number of a street) or telephone number of the material supplier and processing information 81 which is input by the processor from the client computer 3 through the network N. The processing information 81 is input corresponding to the required specification of the furniture manufacturer. More concretely, as the processing information 81 stored is information on a size capable of or capacity of sawing, a size capable of seasoning or time to season, a size capable of compiling or a name of adhesive used, use or non-use of an NC router as a secondary processing or a maximum size capable of processing, a kind or a method of painting, time of delivery or a price.

Communicating means (11*c*, 21*c*, 31*c*, 41*c*, 51*c*) is so arranged to communicate with the other client computer or the server computer 5 through the network N and comprises a modem or the like.

In thus arranged functional block, the CPU 11*a* which controls the input means 10 and the communicating means 11*c* of the client computer 1 provided on the side of the furniture manufacturer and the CPU 51*a* which controls the communicating means 51*c* of the server computer 5 form a means for receiving a condition, and the communicating means 51*c* and the CPU 51*a* of the server computer 5 form a receiving means which receives an input of a condition to be searched. Further the CPU 51*a* which controls the memory means 51*b* and the communicating means 51*c* of the server computer 5 form an output means. In addition, the CPU 21*a* which controls the input means 20 and the communicating means 21*c* of the client computer 2 provided on the side of the material supplier and the CPU 51*a* which controls the communicating means 51*c* of the server computer 5 form a means for receiving material information, and the CPU 31*a* which controls the input means 30 and the communicating means 31*c* of the client computer 3 provided on the side of the processor and the CPU 51*a* which controls the communicating means 51*c* of the server computer 5 form a means for receiving processing information.

Next explained will be a flow in which a furniture manufacturer, a material supplier or a processor inputs a predetermined data by the use of thus arranged system and a flow in which the demander searches a material or a processing method for a desired commodity based on the input information.

First, in case that the furniture manufacturer requests a specification for a commodity to be sold or the material supplier, the furniture manufacturer connects the client computer 1 of the furniture manufacturer with the server computer 5, gets (ST1) a registered screen information on the commodity to be sold and inputs a commodity name, a commodity series name, a size or a stock number as a basic item based on the registered screen information. As a requested specification of components constituting the commodity, material request information or processing request information is input (ST2) so as to register in the memory means 51 of the server computer 5, which enables the thinned-out wood supplier to make registration (ST3). If the client computer 2 of the side of the thinned-out wood supplier is connected with the server computer 5 after operation of registration, information on the registered screen for supplying a material is sent from the server computer 5 to the client computer 2 and a required specification 64 registered in the memory means 51b of the server computer 5 is also sent (ST4). Based on the information thus received, the thinned-out wood supplier inputs and sends (ST5) material information such as a species, a size, a number or a price of the thinned out woods which the supplier holds, and main information such as an address or a telephone number of the supplier so as to store (ST7) the material information and the main information in the memory area 7 for material information of the server computer 5. Similarly, if the client computer 3 of the side of the processor is connected with the server computer 5, information on the registered screen for processing is sent from the server computer 5 to the client computer 3 and a required specification 64 registered in the memory means 51b of the server computer 5 is also sent (ST4). Based on the information thus received, the processor inputs and sends (ST6) processing information such as sawing, seasoning, compiling, a secondary processing or painting and main information such as an address or a telephone number so as to store (ST7) the processing information and the main information in the memory area 8 for processing information of the server computer 5.

In case the demander searches a desired commodity by accessing the server computer 5 wherein registration has been completed, the demander inputs desired information on the commodity, material or processing (ST8) by the use of an input screen provided by the server computer 5.

Figure 5:
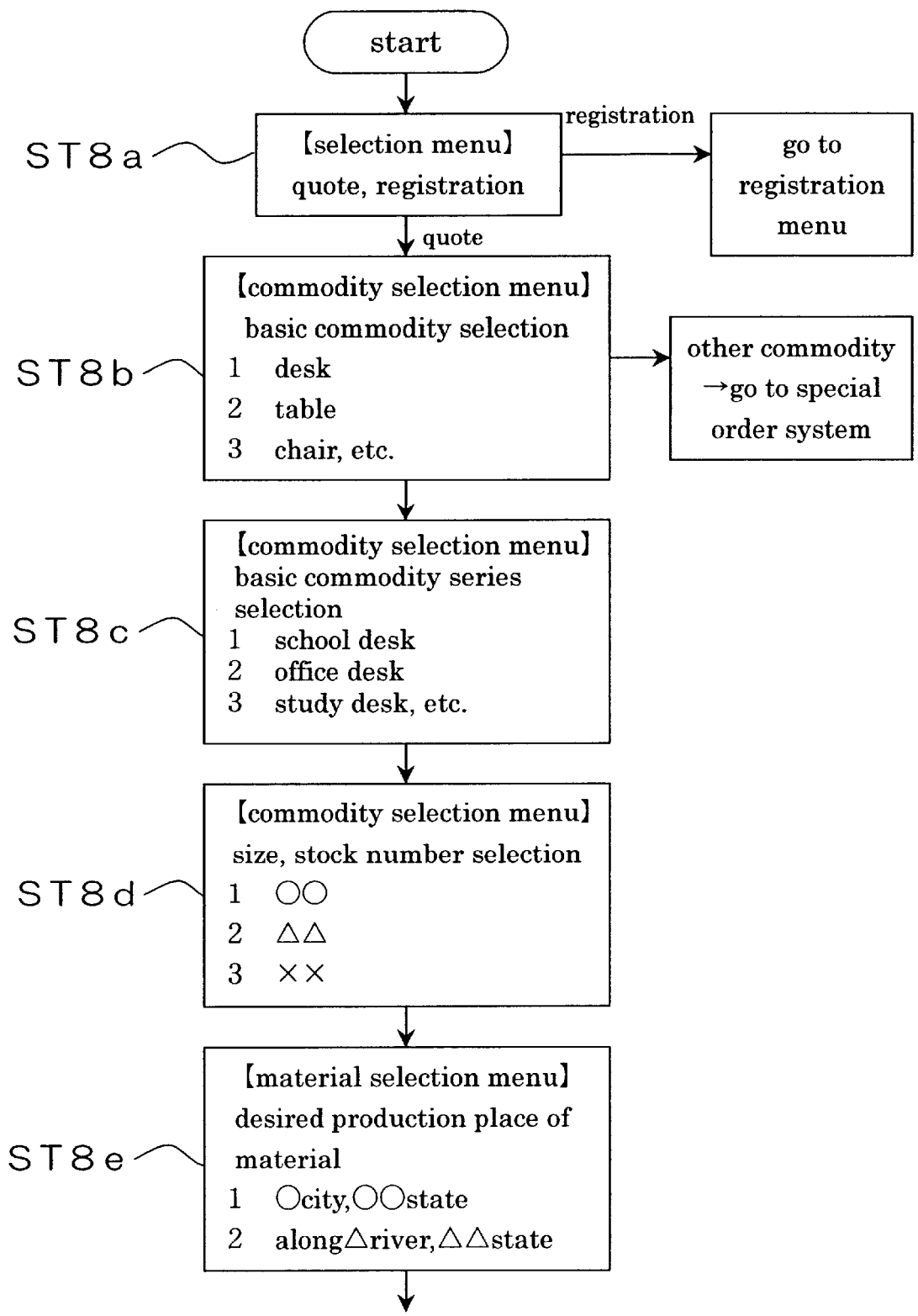
FIG. 5 is a screen flow chart of a client computer of a demander in the embodiment.
Figure 6:
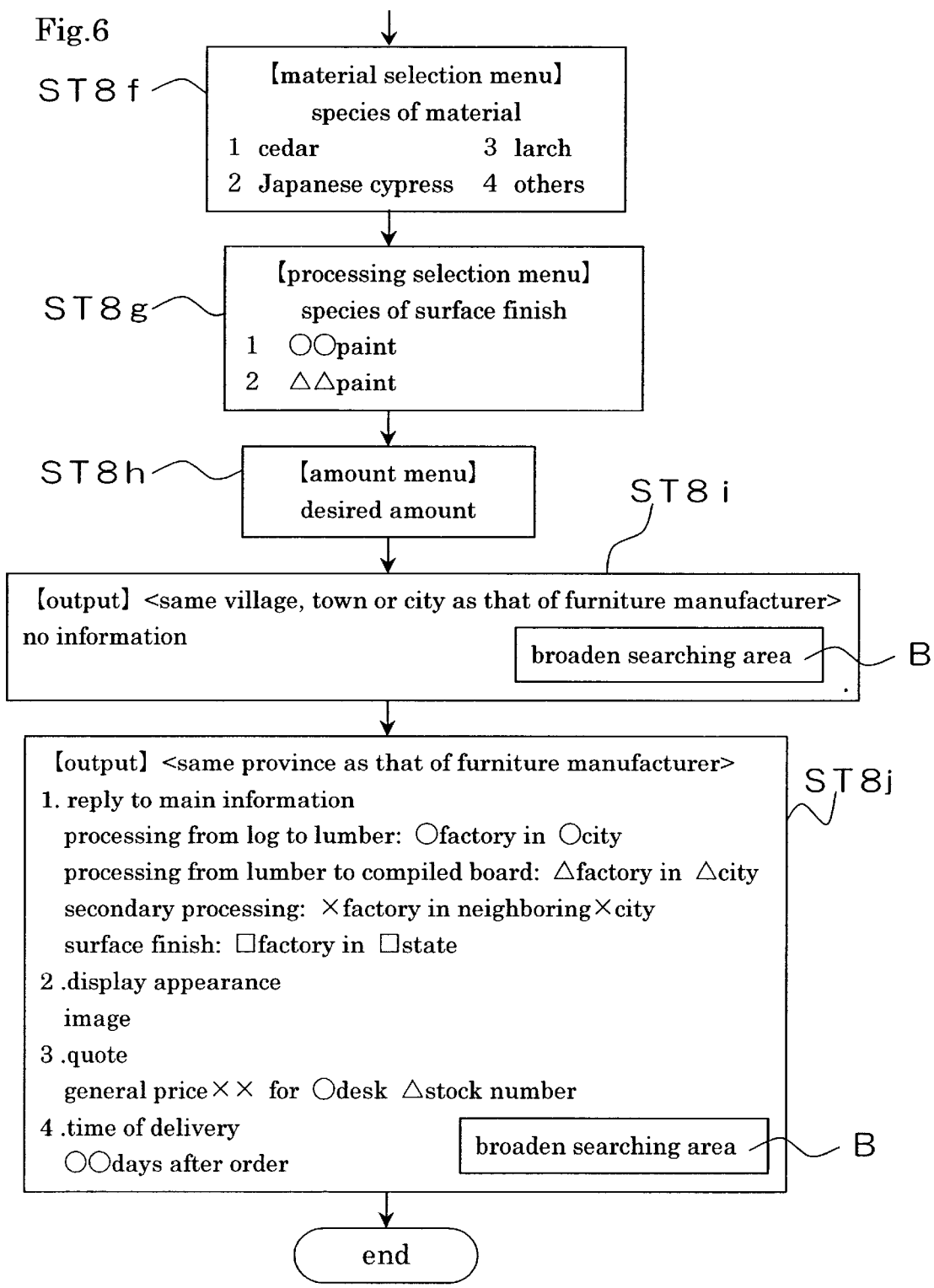
FIG. 6 is the screen flow chart of the client computer of the demander in the embodiment.

More specifically, when the demander accesses the server computer 5 and inputs a predetermined URL, information on an initial screen is sent from the server computer 5 and a screen to quote or to make registration is displayed (ST8a) on a display of the client computer 4 of the demander, as shown in FIG. 5 and FIG. 6. Then if the screen to quote is selected, a commodity name as a rough classification of the basic item registered by the furniture manufacturer is read out from a memory area 60 for a commodity name of the server computer 5 and the commodity names are displayed on a display of the client computer 4 so as to enable selection of the commodity name (ST8b). If one of the commodities, for example, a desk is selected from among the displayed commodity names, a commodity series name corresponding to the desk is read out from a memory area 61 for a series commodity name of the server computer 5 and displayed so as to enable selection of the series commodity name (ST8c). Corresponding to the selection of the series commodity name, a stock number corresponding to the series commodity name is read out from a memory area 63 for information on the stock numbers of the server computer 5 and is displayed so as to enable selection of the stock number (ST8d). Registration of information on the desired commodity is completed with the selection of the stock numbers.

Next, an input screen concerning preference for a production place of the material is provided in a display of the client computer 4 in order to allow the demander to input his or her preference for the material to the selected commodity and an input concerning a desired production place is allowed (ST8e). The desired production place can be input directly by the use of the keyboard as well as it can be selected from information on the production place previously registered in the memory area 63 for specification information of the server computer 5. In case a desired production place is input, an input screen concerning a desired species of wood is displayed on the client computer 4 in order to allow the demander to input his or her preference for a species of wood (ST8f). In this case also, the desired species of wood can be input directly by the use of the keyboard as well as it can be selected from information on the species of wood previously registered in the memory area 63 for specification information of the server computer 5.

Figure 7:
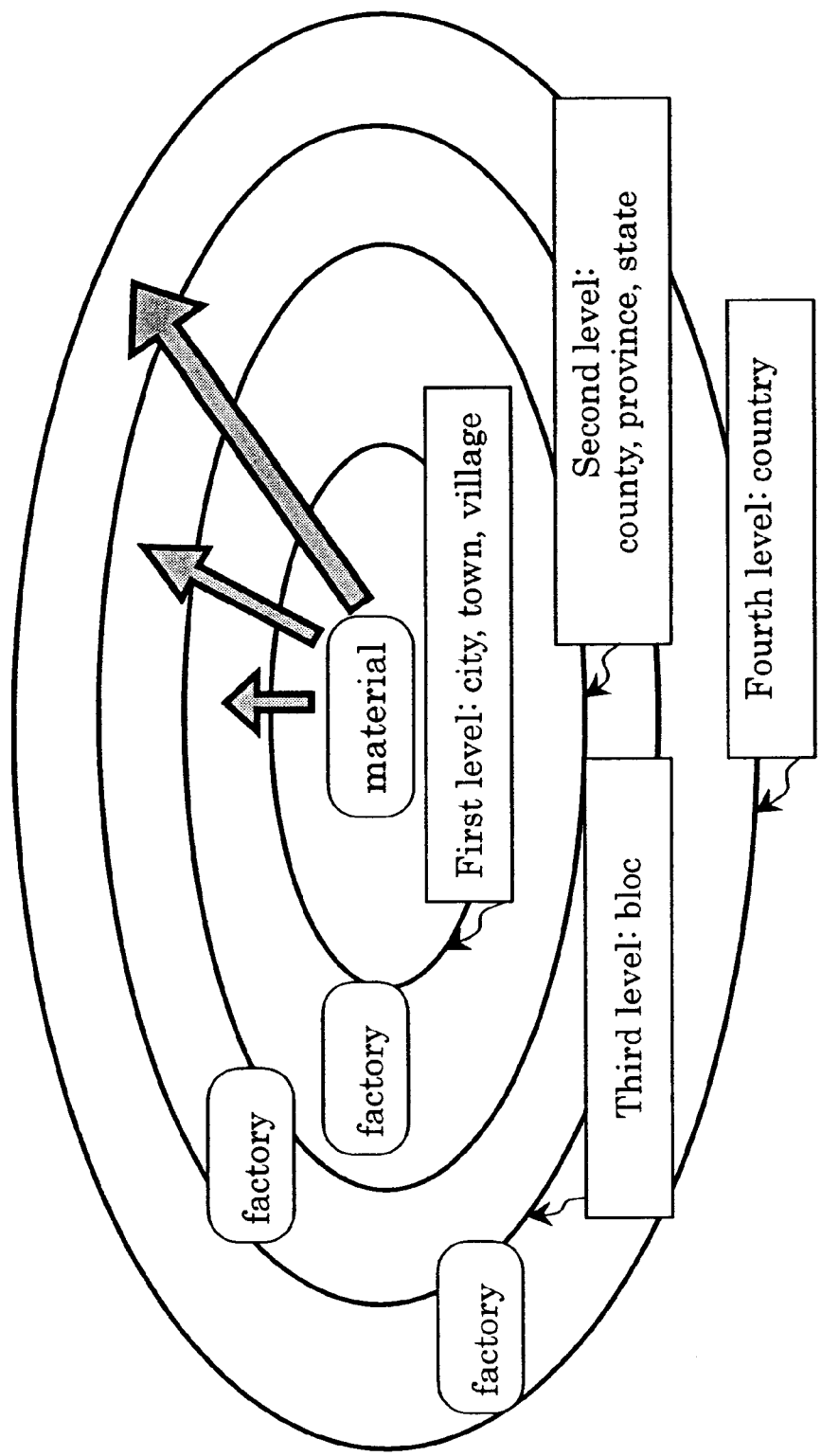
FIG. 7 is a diagram showing a concept for search in the embodiment.

When desired information on the material has been selected and input, desired information on surface finish and other desired information on processing can be input (ST8g) to allow input of a processing method or the like desired by the demander corresponding to the specification of the commodity. Finally when input of a number to order is received (ST8h), the memory area 6 for material information or the memory area 7 for processing information of the server computer 5 is searched based on an input condition and names, addresses or telephone numbers of the registered material supplier or the processor are read out from the memory areas 70, 80 for main information and output to the client computer 4 (ST8i). In this case, a city, town or village name in the main information 60 of the furniture manufacturer which makes the selected commodity is read out as a first level based on the main information 60 concerning the furniture manufacturers and corresponding information which belongs to the same city, town or village name is searched. If the corresponding information does not exist in a searched area or if the corresponding information is desired to search in an area broader than the searched area, push a button B of "broaden searching area" displayed in the screen. In case the button B is pushed, a state name in the main information 60 of the furniture manufacturer is read out as a second level and corresponding information which belongs to the name of the state is searched (ST8j). At the same time based on a condition that the "broaden searching area" button B is pushed, an area to be searched is broadened, as shown in FIG. 7, such as from a level of a city, town or village to a level of a country gradually.

When the corresponding information is output to a screen, an image 65 of the finished commodity stored in the memory area 6 for commodity information of the server computer 5 is output and shown on the display of the client computer 4 so as to image an appearance of the finished commodity. In addition, as a reply to the screen to quote, an estimated price is displayed according to the information on the selected material or the processing. Further, a general appointed date of delivery is output and shown in a display of the client computer 5 based on the information on the appointed date of delivery stored in the memory area 7 for material information and the memory area 8 for processing information according to the selected material or the processing method (ST8j, ST9).

In accordance with the arrangement of the embodiment, the information on the material or the processing which is an object to be searched is stored in advance together with an address of the material supplier or the processor and when a condition concerning the material or the processing is input, a material supplier or a processor which locates in an area where the manufacturer of a final product locates is output. If the desired material or the processing which corresponds to the condition does not exist in the area or if the corresponding information is desired to search in a neighboring area even though there exists the desired information in the area, the "broaden searching area" button B is pushed so as to broaden the area to be searched gradually from a level of a city, town village through a level of a state or bloc to a level of a country. As a result, a person who inputs the information does not have to check nor input a name of the neighboring area by himself, which makes it easy to search a supplier or a processor in a neighboring area.

In this embodiment the required specification for the material or the processing is registered by a manufacturer of a final commodity and information on the material or the processing which the material supplier or the processor can provide is registered based on the specification by the material supplier or the processor. As a result, a trouble that it becomes impossible to assemble a commodity based on the searched result can be prevented. In addition it becomes smooth for the material supplier to make registration if the required specification is disclosed.

This invention is not limited to the above-mentioned embodiment and may be variously modified without departing from a spirit of the invention. More specifically, in the embodiment of the invention both of the species of the thinned-out wood and the processor can be selected, however, only the species of the thinned-out wood may be selected. In the above embodiment the thinned-out wood is explained as an example of the material, however, the material is not limited to this. The above embodiment can be applied to any industries which regard a factor of an area relating to an object as important when the object is searched.

In this embodiment the server computer 5 is explained as a body separated from the client computers 1 through 4, however, the client computer 1 of the furniture manufacturer and the server computer 5 may be integrated. Further, each of the client computers 1 through 4 may be integrated with other client computer, for example, the client computer 1 of the furniture manufacturer may also serve as the client computer 4 of the demander. In this case, for example, when the furniture manufacturer supplies a local self-governing body with a large number of conference desks, the furniture manufacturer can select a material supplier or a processor locating in an area of the local self-governing body, thereby to contribute to promotion for the area of the local self-governing body.

In addition, in this embodiment, the information on the material supplier or the processor is first searched in a village, town or city and then searched in a broader area, namely, in a county, a province, a state and a country, however, the information may first be searched in an area where a distance between the manufacturer and the area is substantially the shortest. In this case, for example, it may be so arranged that both of a longitude and a latitude are detected based on addresses of a material supplier and a furniture manufacturer, and that a material supplier whose distance from the furniture manufacturer is the shortest will be output first, then the next to the shortest follows to be output in order.

In this embodiment, the information on a material supplier or a processor is output in an order of the distance between the furniture manufacturer and the material supplier or the processor, however, it may be so arranged that an area to which a demander who purchases a product belongs can be input and that information within the area is output in order.

As mentioned above, in the present claimed invention the information on an object to be searched is stored in advance together with the information on an area relating to the object to be searched and when a condition which is to be the object to be searched is input, an object which belongs to a specific area is output. If desired material or processing which meets the condition does not exist in the area or if information is desired to search in a neighboring area even though there exists desired information in the area, input to instruct to broaden an area to be searched is received and the area where search is conducted is made to be gradually broader than the specific area. As a result, a person who inputs the information does not have to check nor input all names of the neighboring areas by himself, which makes it easy to search a neighboring supplier or a processor.

In addition, in case that the information on the material or the processing facility which the material supplier or the processor can provide and the information on an addresses of the material supplier or the processor as an object to be searched are registered and the information on the material or the processing can be searched by a demander or a manufacturer of a final product, and that an area where search is conducted can gradually be broadened if desired material or processing which meets the condition does not exist in the area or if information is desired to search in a neighboring area even though there exists desired information in the area. This makes it possible to reduce a transporting cost.

In case registration of information on what a material supplier or a processor can provide is received, a manufacturer which makes a final product registers a required specification concerning the material or the processing method in advance so that the material supplier or the processor can make a registration based on the required specification. This makes it possible for the manufacturer to be free from inconvenience during a process of making a final product. In addition, it becomes smooth for the material supplier or the processor to register the information because a range of the information to be disclosed by the material supplier or the processor becomes clear.

What is claimed is:

1. A search unit for searching information in a memory means, wherein the memory means stores information regarding material supplied by a material supplier and production place of the material or an area where the material supplier is located, comprising:

condition receiving means which receives an input of a search condition concerning the material including designation of a searching range to be first searched;

searching means capable of conducting a search any number of times by changing the searching range each time, wherein:

a) the searching means first searches the information in the memory means which relates to the material produced in the production place contained within the searching range, or supplied by the material supplier located within the searching range, and satisfies the search condition received by the condition receiving means;

b) optionally, changing the input regarding the searching range of the first or a subsequent search wherein the searching means then searches the information in the memory means which relates to the material produced in the production place contained within a searching range, or supplied by the material supplier located within a searching range, broader than the searching range set in the previous search and satisfies the search condition received by the condition receiving means;

c) optionally repeating step (b); and output means which outputs the information on the material searched by the searching means.

2. The search unit according to claim 1 wherein the memory means stores information regarding material based on specification requirements.

3. A search unit for searching information in a memory means, wherein the memory means stores information regarding processing provided by a processing provider and an area where the processing provider is located, comprising:

condition receiving means which receives an input of a search condition concerning the processing including designation of a searching range to be first searched;

searching means capable of conducting a search any number of times by changing the searching range each time, wherein:

a) the searching means first searches the information in the memory means which relates to the processing provided by the processing provider located within the searching range and satisfies the search condition received by the condition receiving means;

b) optionally, changing the input regarding the searching range of the first or a subsequent search wherein the searching means then searches the information in the memory means which relates to the processing provided by the processing provider located within a searching range broader than the searching range set in the previous search and satisfies the search condition received by the condition receiving means;

c) optionally repeating step (b); and output means which outputs the information on the processing searched by the searching means.

4. The search unit according to claim 3 wherein the memory means stores information regarding processing based on specification requirements.

5. A search system comprising:

condition receiving means which receives an input of a search condition based on the material including designation of a searching range to be first searched, searching means capable of conducting a search any number of times by changing the searching range each time, wherein:

a) the searching means first searches the information in the memory means which relates to the material produced in the production place contained within the searching range, or supplied by the material supplier located within the searching range, and satisfies the search condition received by the condition receiving means;

b) optionally, changing the input regarding the searching range of the first or a subsequent search wherein the searching means then searches the information in the memory means which relates to the material produced in the production place contained within a searching range, or supplied by the material supplier located within a searching range, broader than the searching range set in the previous search and satisfies the search condition received by the condition receiving means;

c) optionally repeating step (b); and output means which outputs the information on the material searched by the searching means.

6. A search system according to claim 5 wherein the memory means stores information regarding material which is input based on specification requirements.

7. A search system comprising:

condition receiving means which receives an input of a search condition concerning the processing including designation of a searching range to be first searched, searching means capable of conducting a search any number of times by changing the searching range each time; wherein:

a) the searching means first searches the information in the memory means which relates to the processing provided by the processing provider located within the searching range and satisfies the search condition received by the condition receiving means;

b) optionally, changing the input regarding the searching range of the first or a subsequent search wherein the searching means then searches the information in the memory means which relates to the processing provided by the processing provider located within a searching range broader than the searching range set in the previous search and satisfies the search condition received by the condition receiving means;

c) optionally repeating step (b); and output means which outputs the information on the processing searched by the searching means.

8. A search system according to claim 7 wherein the memory means stores information regarding processing based on specification requirements.

9. A method for searching information stored in a memory means which stores information regarding material supplied by a material supplier and production place of the material or an area where the material supplier is located, comprising:

a step to receive an input of a search condition concerning the material including designation of a searching range to be first searched;

a step to first search the information in the memory means which relates to the material produced in the production place contained within the searching range, or supplied by the material supplier located within the searching range, to be first searched and satisfies the search condition;

a step to receive an input of instruction to change the searching range;

a step to search the information in the memory means which relates to the material produced in the production place contained within a searching range, or supplied by the material supplier located within a searching range, broader than the searching range set in the previous search when the instruction is received after the first or subsequent searches and satisfies the search conditions; and a step to output the material searched in the first searching step or the second and subsequent.

10. The method according to claim 9 wherein the memory means stores information regarding material based on specification requirements.

11. A method for searching information stored memory means which stores information on processing provided by a processing provider and an area where the processing provider is located, comprising:

a step to receive an input of a search condition concerning the processing as the search condition including designation of a searching range to be first searched;

a step to first search the information in the memory means which relates to the processing provided by the processing provider located within the searching range to be first searched and satisfies the search condition;

a step to receive an input of instruction to change the searching range;

a step to search the information in the memory means which relates to the processing provided by the processing provider located within a searching range broader than the searching range set in the previous search when the instruction is received after the first or subsequent searches and satisfies the search conditions; and a step to output the processing the object searched in the first searching step or the second and subsequent search.

12. The method according to claim 11 wherein the memory means stores information regarding processing based on specification requirements.

* * * * *

UNITED STATES PATENT AND TRADEMARK OFFICE
CERTIFICATE OF CORRECTION

PATENT NO. : 6,738,785 B2  Page 1 of 1
DATED : May 18, 2004
INVENTOR(S) : Yukihiko Nansho et al.

It is certified that error appears in the above-identified patent and that said Letters Patent is hereby corrected as shown below:

<u>Title page,</u>
Item [73], Assignee, replace "Kukuyo Co., Ltd." with -- Kokuyo Co., Ltd. --

Signed and Sealed this

Third Day of May, 2005

JON W. DUDAS
*Director of the United States Patent and Trademark Office*